F. B. PEASE.
FRUIT SORTING MACHINE.
APPLICATION FILED NOV. 18, 1907.

898,600.

Patented Sept. 15, 1908.
2 SHEETS—SHEET 1.

WITNESSES:
L. Thou.
C. W. Carroll

INVENTOR
Franklin B. Pease
by Apgar & Lewis
his Attys

F. B. PEASE.
FRUIT SORTING MACHINE.
APPLICATION FILED NOV. 18, 1907.
898,600.
Patented Sept. 15, 1908.
2 SHEETS—SHEET 2.
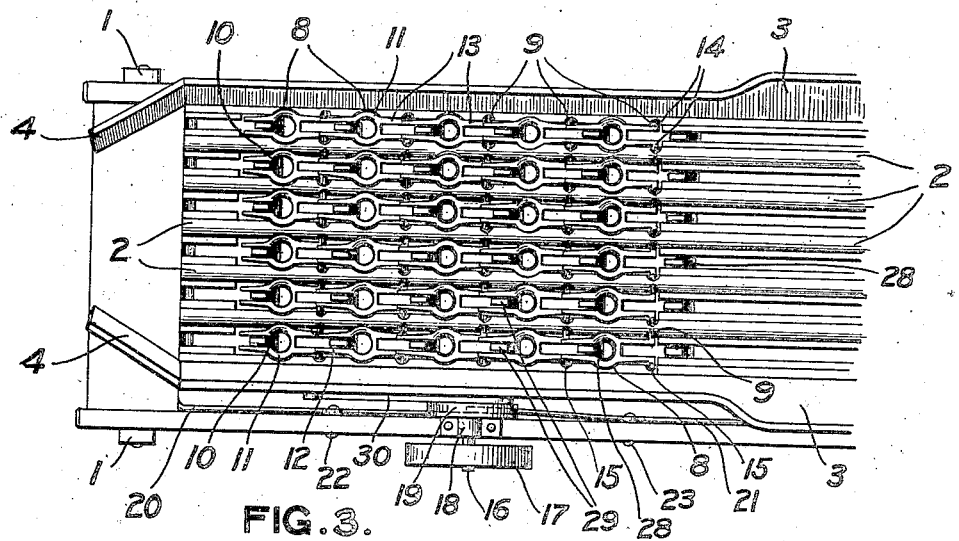
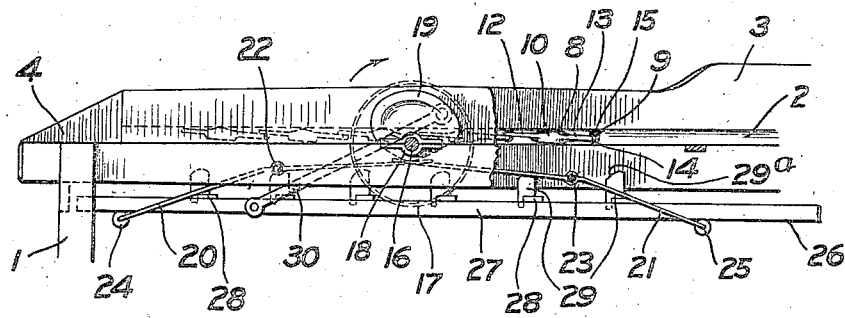
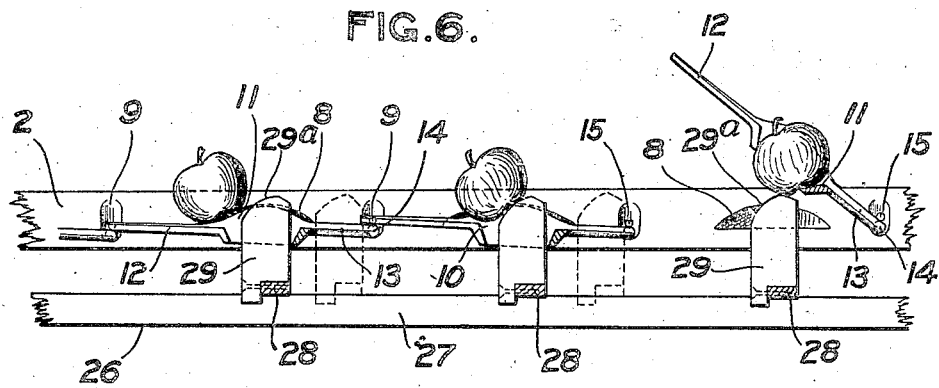
WITNESSES:
INVENTOR

UNITED STATES PATENT OFFICE.

FRANKLIN B. PEASE, OF ROCHESTER, NEW YORK.

FRUIT-SORTING MACHINE.

No. 898,600.     Specification of Letters Patent.     Patented Sept. 15, 1908.

Application filed November 18, 1907. Serial No. 402,651.

*To all whom it may concern:*

Be it known that I, FRANKLIN B. PEASE, a citizen of the United States, and resident of Rochester, in the county of Monroe and State of New York, have invented certain new and useful Improvements in Fruit-Sorting Machines, of which the following is a specification.

This invention relates to fruit sorting machines, and has for its object to provide a device for the purpose of sorting or grading fruit of different sizes, which shall be cheap in construction, simple in operation, and which will handle the fruit as aforesaid rapidly and with minimum damage thereto.

Figure 1:
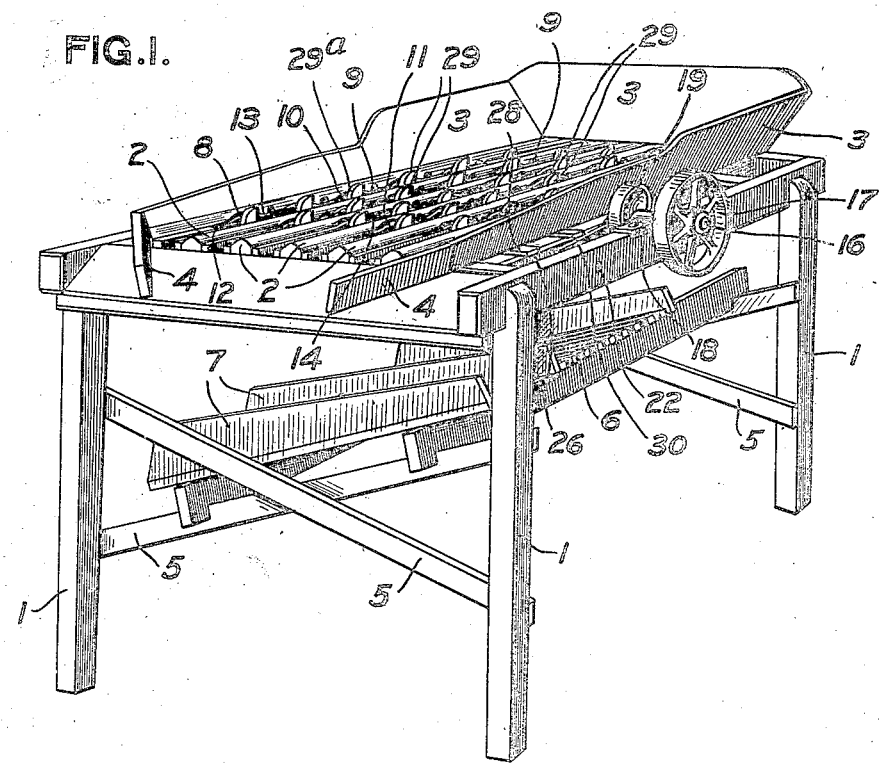
Figure 4:
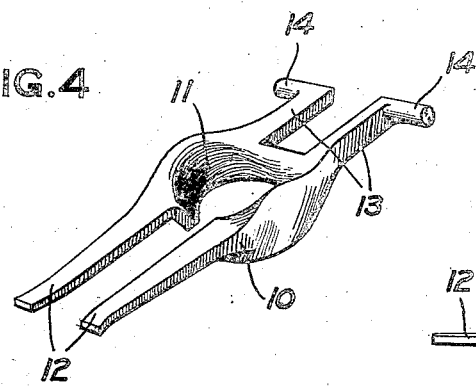
Figure 5:
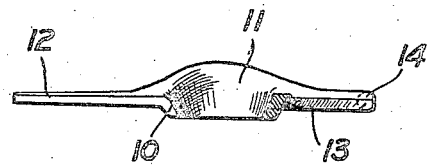

In the drawings:—Figure 1 is a perspective view of the complete device; Fig. 2 is a plan view thereof; Fig. 3 is an elevation of Fig. 2, partly broken away; Fig. 4 is a perspective view of a detail; Fig. 5 is a longitudinal central section of the part shown in Fig. 4; and Fig. 6 is an enlarged view showing some of the parts illustrated in Fig. 3, but in a different position.
The device comprises, in brief, a table, having legs 1, 1, 1, 1, and a top made up of longitudinal bars 2 that are separated from each other a suitable distance (Fig. 2). Boards 3 extend across the back and along the sides of the table-top, forming in combination with the latter, a hopper in which fruit may be placed. Converging boards 4 at the front ends of the boards 3, serve to guide the fruit which is too large to pass through the sorter into a suitable receptacle.

The cross braces 5, 5, of the legs 1, etc. serve to support a leg 6, which is divided by boards 7, 7 into two or more parts. Into the separate trays or chutes thus formed the fruit in different sizes drops from the sorting mechanism, and fruit of each size runs down its respective chute into a receptacle placed at the lower end thereof.

The upper sides of the bars 2 are rounded (Fig. 1) so as to present a non-abrasive surface to the fruit. The said bars are so placed as to have a slight downward slope toward the front end of the machine (Figs. 3 and 6), and constitute part of a channel, the bottom of which has a series of sorting orifices, each for permitting the passage of a fruit of predetermined size. In the present example of this invention the orifices are made in separate, removable, changeable, tilting pieces, as will be described.

Recesses 8, 8 and 9, 9 (Fig. 2) are cut in the bars 2 at suitable intervals, for the purpose of receiving the sorting cups 10. The construction of said cups is illustrated in Figs. 4 and 5.

The cup portion proper consists of a ring 11, smaller at the bottom than at the top, in order that a piece of fruit may readily roll into it. The fruit, in order to drop through the ring 11 into the chute below, must not be larger at any point than the inside diameter of the lower edge of said ring. If the fruit exceeds the dimensions of the ring, it is passed on to the next cup toward the front, by means of a suitable mechanism hereinafter described. The cups increase in size toward the front of the machine, so that fruit of smaller diameter may pass through the cups at the rear, and fruit of larger diameter through those nearer the front.

Each cup or ring 11 bears a forwardly-extending fork 12 and a rearwardly-extending fork 13. Trunnions 14 are cast on the rear end of the fork 13, and are adapted to lie in the bearing recesses 9 of the bars 2. Pins 15 (Fig. 6) driven into said bars above the trunnions 14 prevent the latter from being lifted upward from said recesses. The rings or cup portions 11 rest in the recesses 8, and the forks 12 lie upon or overlap the rear fork 13 of the cup next toward the front of the machine. Each pair of bars 2 and the cups 10 supported thereby comprise a channel down or along which fruit may be moved from the rear to the front of the machine, and the cups constitute a bottom for the channel.

A shaft 16, having a drive-pulley 17, is supported by bearings 18 in one side-frame of the machine, approximately at the center thereof (Figs. 1 and 3). On the said shaft is a cam 19, the lower edge of which bears downward upon the ends of a pair of bails 20 and 21 (Fig. 3), which are pivoted to the machine frame at 22 and 23, respectively. On the lower end of said bails are rollers 24 and 25, which extend transversely to the bars 2 and support a movable rack 26. The weight of said rack tends to force the rollers 24 and 25 downward, and so to move the bails 21 about their respective pivots 22 and 23, thereby holding the upper ends of said bails constantly against the lower edge of the cam 19.

The rack 26 is composed of a pair of longitudinal bars 27, held together by transverse bars 28. The latter are spaced the same distance apart lengthwise of the machine as are the cups 10. Fingers 29 (Figs. 3 and 6) are fastened upon the crossbars 28 and are spaced so as to be in line vertically with the longitudinal axis of the forks 12 and 13. A pitman 30 is pivoted to the inner face of the cam 19, and the side of the rack 26.

The operation of the device is as follows: The shaft 16 is rotated as shown by the arrow in Fig. 3. The pitman 30 therefore moves with the cam 19 and imparts a forward and backward movement to the rack 26. At the same time the face of the cam 19 acts upon the bails 20 and 21, causing them to lift and lower said rack vertically. The rack rides upon the rollers 24 and 25 in its longitudinal movement. The cam 19 is so placed with regard to the pitman 30 that the rack is raised to the position shown in Fig. 6 when at its rear limit of travel, and then is carried forward to the limit of movement in that direction, and finally lowered again and moved backward. In the upward movement the fingers 29 are projected through the rings 11, and fruit resting in said rings is displaced therefrom by means of the curved face 29$^a$ on said fingers. The rack 26 is then carried forward and the fingers 29 travel along in the forks 13 and 12, pushing the fruit before them down the inclined bars 2 into the next cup ahead. If this next cup is larger than the one from which the fruit was removed, the latter drops through it and falls into the chute below. If said cup is too small for the fruit to pass through, the next movement of the rack carries the fruit another step forward, and finally it reaches a cup through which it may pass. After the rack has been carried forward to the limit of travel by the pitman 30, the cam face allows the inner ends of the bails 20 and 21 to lift, thereby lowering said rack as aforesaid. The pitman by this time has passed the dead center, and the backward movement of the rack begins.

In Fig. 3 the rack is shown nearly at the limit of its rearward movement; in Fig. 6 it is shown in solid lines at the beginning of the forward stroke; and in the same figure the dotted lines show the fingers 29 at the extreme forward position.

If a piece of fruit should become jammed or wedged tightly in any cup, the finger 29 beneath strikes the fruit, and the fruit and cup together are lifted (Fig. 6), the latter turning upon the trunnions 14. The operator's attention is thus called to the wedged fruit, and he may release it by hand. The free yielding, or tilting movement of the cups 10 thus permitted prevents injury to either the fruit or the machine.

Any size of cups may be substituted for those in the machine, for the purpose of grading different fruits. Plums or peaches, for instance, require smaller cups, as a rule, than do apples. To remove any cups, the pins 15 which are driven into the bars 2 above the trunnions 14 are pulled out with a suitable tool, such as a pair of pliers. The cup may then be lifted out of the frame, a new one put in its place, and the pins 15 again driven in.

What I claim is:

1. In a fruit sorting machine, a channel, a bottom therefor having a series of removable, changeable, yielding bottom pieces, each having a sorting orifice, and means adapted to project into each orifice from beneath and to move fruit therefrom to the orifice of the next bottom piece in the series.

2. In a fruit sorting machine, a channel, a bottom therefor having a series of tilting bottom pieces, each having a sorting orifice, and means adapted to project into each orifice from beneath and to move fruit therefrom to the orifice of the next bottom piece in the series.

3. In a fruit sorting machine, a channel, a bottom therefor having a series of tilting bottom pieces, each pivoted in said channel and each having a sorting orifice, and means adapted to project into each orifice from beneath and to move fruit therefrom into the next orifice in the series.

4. In a fruit sorting machine, a channel, a bottom therefor having a series of removable, changeable, yielding bottom pieces, each having a sorting orifice, a series of movable fingers, one for each orifice, and means for moving said fingers upward into the orifices and toward the next orifices in the series.

5. In a fruit sorting machine, a channel, a bottom therefor having a series of tilting bottom pieces, each having a sorting orifice, a series of movable fingers, one for each orifice, and means for moving said fingers upward into the orifices and toward the next orifices in the series.

6. In a fruit sorting machine, a channel, a bottom therefor having a series of tilting bottom pieces, each pivoted in said channel and each having a sorting orifice, a series of movable fingers, one for each orifice, and means for moving said fingers upward into the orifices and toward the next orifices in the series.

7. In a fruit sorting machine, a channel, a bottom therefor having a series of yielding bottom pieces, each having a sorting orifice, a series of upright movable fingers, one for each orifice, and means for reciprocating said fingers upward into the orifices, then forward along the series, downward and backward.

8. In a fruit sorting machine, a channel, a bottom therefor having a series of tilting bottom pieces, each having a sorting orifice, a series of movable fingers, one for each orifice, and means for reciprocating said fingers upward into the orifices, then forward along the series, downward and backward.

9. In a fruit sorting machine, a channel, a bottom therefor having a series of tilting bottom pieces, each pivoted in said channel and each having a sorting orifice, a series of movable fingers, one for each orifice, and means for reciprocating said fingers upward into the orifices, then forward along the series, downward and backward.

10. In a fruit sorting machine, a channel, a series of contiguous bottom pieces therein, each removably pivoted in said channel and each having a sorting orifice, and means adapted to project into each orifice from beneath and to move fruit therefrom into the next orifice in the series.

11. In a fruit sorting machine, a channel, a series of contiguous bottom pieces therein, each removably pivoted in said channel and each having a sorting orifice, a series of movable fingers, one for each orifice, and means for moving said fingers upward into the orifices, then forward, then downward and backward.

12. In a fruit sorting machine, a channel, a series of bottom pieces for said channel, each having trunnions and a sorting orifice, the said channel having bearings for the trunnions, and means adapted to project into each orifice from beneath and to move fruit therefrom into the next orifice in the series.

13. In a fruit sorting machine, a channel, a series of bottom pieces for said channel, each having trunnions and a sorting orifice, the said channel having bearings for the trunnions, a series of movable fingers, one for each orifice, and means for reciprocating said fingers upward into the orifices, then forward, then downward and backward.

14. In a fruit sorting machine, a channel, a series of bottom pieces for said channel, each having trunnions and a sorting orifice and a portion adapted to rest on the next bottom piece in the series, the said channel having bearings for the trunnions, and means adapted to project into each orifice from beneath and to move fruit therefrom into the next orifice in the series.

15. In a fruit sorting machine, a channel, a series of bottom pieces for said channel, each having trunnions and a sorting orifice and a portion adapted to rest on the next bottom piece in the series, the said channel having bearings for the trunnions, a series of movable fingers, one for each orifice, and means for reciprocating said fingers upward into the orifices, then forward, then downward and backward.

16. In a fruit sorting machine, a channel, a series of upwardly yielding parts forming the bottom of the channel and each having a sorting orifice, and means adapted to project into each orifice from beneath and to move fruit therefrom to the next orifice in the series.

17. In a fruit sorting machine, a channel, a series of upwardly yielding parts forming the bottom of the channel and each having a sorting orifice, a series of movable fingers, one for each orifice, and means for moving said fingers upward into said orifices, then forward toward the next orifices in the series, then downward and backward to positions under said orifices.

FRANKLIN B. PEASE.

Witnesses:
D. GURNEE,
L. THON.